Jan. 26, 1926.  1,570,972

T. H. SEIFERT

CEMENT VAULT HANDLE

Filed June 27, 1924

Inventor

T. H. Seifert

By C. A. Snow & Co

Attorneys

Patented Jan. 26, 1926.

1,570,972

UNITED STATES PATENT OFFICE.

THOMAS H. SEIFERT, OF SPRINGTOWN, PENNSYLVANIA.

CEMENT-VAULT HANDLE.

Application filed June 27, 1924. Serial No. 722,790.

*To all whom it may concern:*

Be it known that I, THOMAS H. SEIFERT, a citizen of the United States, residing at Springtown, in the county of Bucks and State of Pennsylvania, have invented a new and useful Cement-Vault Handle, of which the following is a specification.

This invention relates to handles for cement vault covers.

The object of the invention is to provide a strong and effective handle for use in connection with cement vault covers to facilitate handling of the cover and lowering thereof into the grave after the casket has been placed in the vault.

Another object is to provide a handle of this character which is connected with the reinforce of the vault top or lid before the cement is poured in the mould and after the cement is set the handle is pulled out to project beyond the surface thereof and then the cement finished around the handle so that when the cement hardens the handle will be securely fixed.

With the foregoing and other objects in view which will appear as the description proceeds, the invention resides in the combination and arrangement of parts and in the details of construction hereinafter described and claimed, it being understood that changes in the precise embodiment herein disclosed may be made within the scope of what is claimed without departing from the spirit of the invention.

In the accompanying drawings:—

Figure 3:
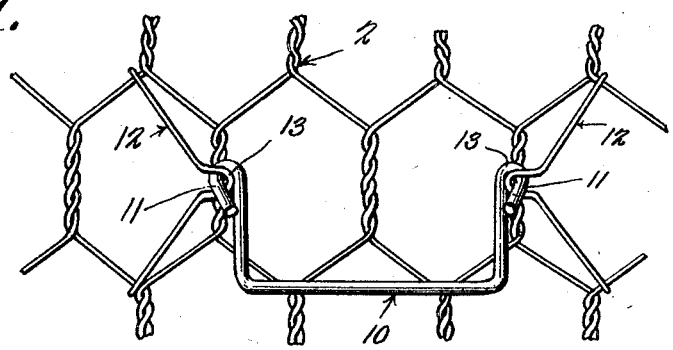
Fig. 3 is an enlarged side elevation showing the handle connected with the cement reinforce.
Figure 4:
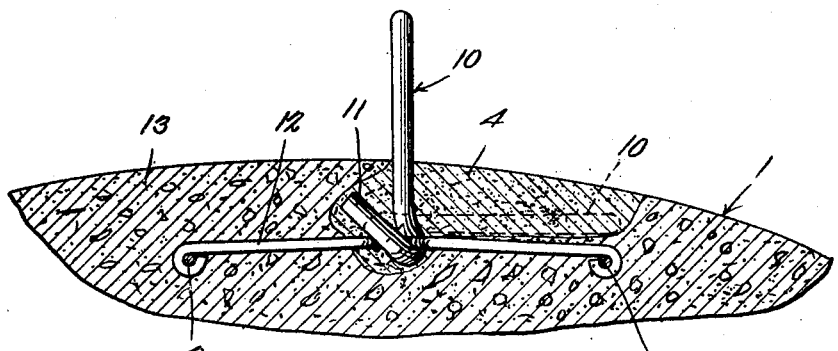
Fig. 4 is an enlarged detail sectional view showing the handle after it has been secured and the lid completed.

In the embodiment illustrated a cement vault lid or top 1 is shown having the usual metal reinforce 2 embedded therein and here shown composed of a plurality of twisted wires connected together and to which the handle 10 constituting this invention is shown applied. The handle 10 any desired number of which may be employed according to the size and weight of the lid 1 to be supported, is preferably made bail-shaped as shown in Fig. 3 and the free ends thereof are bent to form hooks 11 the terminals of which are deflected at an angle to the body portion of the handle as shown in Fig. 4. These hooks 11 have substantially V-shaped hangers 12 engaged therewith and which are connected at their ends to the reinforcing wires of the member 2. The apices of these members 12 have loops 13 formed therein with which the hooks 11 are connected.

Figure 1:
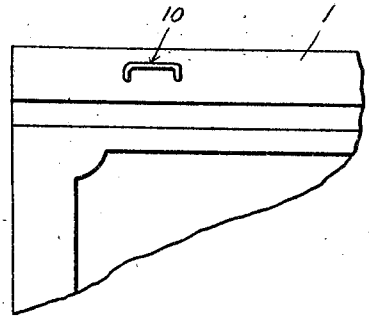
Figure 1 represents a side elevation of one corner of a cement vault equipped with a lid having this improved handle attached thereto.
Figure 2:
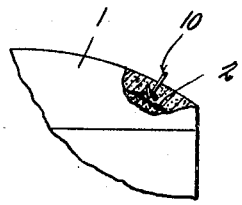
Fig. 2 is a detail end elevation with parts broken out to show the mounting of the handle in the lid.

The hangers 12 are shown arranged transversely relatively to the lid 1 in connection with which the handles are to be used so that the handles when engaged therewith will be disposed longitudinally of the lid as shown in Fig. 1 although obviously they need not necessarily be so arranged.

After the hangers 12 have been connected with the reinforce 2 and the handles 10 engaged with said hangers the cement 3 from which the lid 1 is to be formed is poured into the mould around the reinforce and thus embeds the reinforce with the handle mounted thereon in the cement. After the cement sets and then before it hardens the handles 10 are pulled out into the position shown in Fig. 4 and cement 4 is filled into spaces formerly occupied by the handles and the handles 10 will be securely held in the position shown and will reliably support the weight of the lid without danger of breakage or accidental separation from the lid.

The arrangement of the hook members 11 of the handle at an oblique angle to the body portion thereof adapts them when engaged with the loops 13 of the hangers 12 and opened out into position at right angles to the reinforce 2 to engage said loops and securely hold the handles against pivoting in one direction as is shown clearly in Fig. 4.

While these handles 10 are primarily designed for use in connection with vault covers or lids obviously they may be used in connection with any other cement structures in which handles are necessary.

I claim:

A portable cement structure having a metal reinforce embedded therein, substantially V-shaped hangers connected with said reinforce and provided in their apices with loops, handles having hooks at their ends engaged with said loops, the bills of said hooks being deflected at an angle to the body of the handle for engagement with the loops when the handles are arranged at right angles thereto to hold the handles in upright position, said handles and reinforce being embedded in the cement forming the article.

In testimony that I claim the foregoing as my own, I have hereto affixed my signature.

THOMAS H. SEIFERT.